(12) United States Patent
Caverly et al.

(10) Patent No.: US 12,391,298 B2
(45) Date of Patent: Aug. 19, 2025

(54) TRANSLATING POWER ADJUSTABLE STEERING COLUMN WITH GEARED RACK FOR AN ABSOLUTE SENSOR

(71) Applicant: Steering Solutions IP Holding Corporation, Saginaw, MI (US)

(72) Inventors: Jacob A. Caverly, Freeland, MI (US); Todd M. King, Saginaw, MI (US); Randy W. Jones, North Branch, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/657,115

(22) Filed: May 7, 2024

(65) Prior Publication Data

US 2024/0286668 A1 Aug. 29, 2024

Related U.S. Application Data

(63) Continuation of application No. 18/200,267, filed on May 22, 2023, now Pat. No. 11,999,408.

(60) Provisional application No. 63/388,298, filed on Jul. 12, 2022.

(51) Int. Cl.
*B62D 1/189* (2006.01)
*B62D 1/184* (2006.01)
*B62D 1/181* (2006.01)

(52) U.S. Cl.
CPC ............ *B62D 1/189* (2013.01); *B62D 1/184* (2013.01); *B62D 1/181* (2013.01)

(58) Field of Classification Search
CPC .................................................. B62D 1/184
See application file for complete search history.

(56) References Cited

U.S. PATENT DOCUMENTS 5,010,779 A * 4/1991 Herron ................... B62D 1/181
280/775
10,967,900 B2 * 4/2021 Pichonnat .............. B62D 1/195
(Continued)

FOREIGN PATENT DOCUMENTS

CN 111232046 A * 6/2020 ............... B62D 1/11
CN 111741886 A * 10/2020 ............. B62D 1/181
(Continued)

OTHER PUBLICATIONS

Office Action regarding corresponding DE App. No. 10 2023 117 822.9; dated Feb. 28, 2025.

*Primary Examiner* — Nicole T Verley
(74) *Attorney, Agent, or Firm* — Dickinson Wright PLLC

(57) ABSTRACT

An axially adjustable steering column assembly includes an upper jacket. The assembly also includes a lower jacket, wherein the upper jacket is received within the lower jacket and is telecopingly adjustable therein, the lower jacket having a position sensor operatively coupled thereto. The assembly further includes a column mounting bracket, wherein the lower jacket translates and rotates relative to the column mounting bracket. The assembly yet further includes a geared rack operatively coupled to the column mounting bracket, the geared rack correspondingly rotatable with the lower jacket, wherein the geared rack is in contact with a gear wheel of the position sensor to detect the axial position of the axially adjustable steering column assembly.

6 Claims, 5 Drawing Sheets

(56) References Cited

U.S. PATENT DOCUMENTS

| | | | | |
|---|---|---|---|---|
| 2016/0144883 | A1* | 5/2016 | Vermeersch | B62D 1/184 |
| | | | | 74/495 |
| 2018/0086378 | A1 | 3/2018 | Bell et al. | |
| 2020/0156692 | A1 | 5/2020 | Sherwood et al. | |
| 2021/0323596 | A1* | 10/2021 | Gosztyla | B62D 1/16 |
| 2022/0402540 | A1* | 12/2022 | Fevre | B62D 1/192 |
| 2023/0182803 | A1* | 6/2023 | Tinnin | B62D 1/181 |
| | | | | 74/493 |

FOREIGN PATENT DOCUMENTS

| | | | | | |
|---|---|---|---|---|---|
| CN | 113844528 | A | * | 12/2021 | B62D 1/181 |
| DE | 102012024074 | A1 | * | 6/2014 | B62D 3/12 |
| DE | 102018101528 | A1 | * | 7/2019 | B62D 1/181 |
| DE | 102019219008 | A1 | * | 6/2021 | B62D 1/181 |
| DE | 102021109357 | A1 | | 10/2021 | |
| DE | 102021131348 | A1 | * | 6/2023 | B62D 1/181 |
| DE | 102022114095 | B3 | * | 6/2023 | B62D 1/181 |
| DE | 102022132695 | A1 | * | 6/2023 | B62D 1/181 |
| DE | 102022133275 | A1 | * | 6/2024 | B62D 1/181 |
| DE | 102023211543 | A1 | * | 6/2024 | |
| DE | 102023104998 | A1 | * | 9/2024 | B62D 1/181 |
| FR | 3103445 | A1 | * | 5/2021 | B62D 1/181 |
| GB | 2579371 | A | * | 6/2020 | B62D 1/11 |
| JP | 2004345561 | A | * | 12/2004 | |
| JP | 5027974 | B2 | * | 9/2012 | B62D 5/006 |
| JP | 5278761 | B2 | * | 9/2013 | |
| KR | 20240072762 | A | * | 5/2024 | |
| WO | WO-9216403 | A1 | * | 10/1992 | B62D 1/181 |
| WO | WO-2004087483 | A2 | * | 10/2004 | B62D 1/184 |
| WO | WO-2011151003 | A1 | * | 12/2011 | B60R 25/02147 |

* cited by examiner

TRANSLATING POWER ADJUSTABLE STEERING COLUMN WITH GEARED RACK FOR AN ABSOLUTE SENSOR

CROSS-REFERENCE TO RELATED APPLICATION

This application claims the benefits of priority to U.S. patent application Ser. No. 18/200,267, filed May 22, 2023, which claims priority to U.S. Provisional Patent Application Ser. No. 63/388,298, filed Jul. 12, 2022, the disclosures of which are incorporated by reference herein in their entireties.

FIELD OF THE INVENTION

The embodiments described herein relate to vehicle steering systems and, more particularly, to a translating power adjustable steering column with a geared rack for an absolute sensor.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle.

Some steering columns are axially adjustable between positions. In the past, a function of axially adjustable steering columns was to provide flexibility in the location of the hand wheel and facilitate more comfortable driving positions for different sizes of drivers. However, now there are opportunities for significantly more telescopic travel, which also may be referred to as stow travel (i.e., when the hand wheel is not needed). For example, the hand wheel could be repositioned further away from the driver to allow him or her to do things other than operate the vehicle, such as work on a laptop computer when the vehicle is parked. Other examples include vehicles with autonomous driving capability, such that the hand wheel could be stowed when the vehicle is in an autonomous driving mode.

As the automotive industry increasingly heads toward steer-by-wire technologies, more emphasis is being placed on redundancies in position sensing technologies for guarantee of comfort component locations during functional and stow modes. As such, some OEMs may request the use of direct, absolute sensing of steering column telescope position, in contrast with prior reliance upon encoders and Hall-Pulse analysis. Absolute position sensing requires that the sensor be able to physically read the position of the steering column's telescope position. For an externally translating, internally telescoping column, the column assembly has two distinct interfaces that may move simultaneously during a stow function. The first movement is upper jacket movement in relation to the lower jacket (i.e., typical of standard power telescope adjustable columns), but this movement is also paired with a second translating interface between the lower jacket and a column mounting bracket. These two motions together create a high stow rate and large stow displacement in the vehicle that shuttles the handwheel toward and into the instrument panel.

Standard telescope sensing systems with an absolute position sensor involves a geared rack that is driven by the motion of the upper jacket. This geared rack runs along the absolute position sensor, which in turn drives cogged wheels on the sensor. The rotational motion of the cogged wheels is then used to account for the position of the upper jacket in its telescope motion. This externally translating, internally telescoping column poses a challenge regarding how to use an absolute position sensor to sense the displacement of the lower jacket relative to the column mounting bracket. This is because the stowing motion only moves in one plane (i.e., fore/aft in vehicle), while the lower jacket can also articulate vertically during a rake function. This causes a unique situation requiring special considerations as to how a geared rack can be implemented to interface with the absolute position sensor. The geared rack must be fixed in position to the column mounting bracket, but must also be able to articulate with the rake motions of the lower jacket.

SUMMARY

According to one aspect of the disclosure, an axially adjustable steering column assembly includes an upper jacket. The assembly also includes a lower jacket, wherein the upper jacket is received within the lower jacket and is telecopingly adjustable therein, the lower jacket having a position sensor operatively coupled thereto. The assembly further includes a column mounting bracket, wherein the lower jacket translates and rotates relative to the column mounting bracket. The assembly yet further includes a geared rack operatively coupled to the column mounting bracket, the geared rack correspondingly rotatable with the lower jacket, wherein the geared rack is in contact with a gear wheel of the position sensor to detect the axial position of the axially adjustable steering column assembly.

According to another aspect of the disclosure, an axial position sensing system for a steering column assembly includes a column mounting bracket. The axial position sensing system also includes a column structure operatively coupled to the column mounting bracket, the column structure moveable in an axial direction relative to the column mounting bracket and rotatable relative to the column mounting bracket. The axial position sensing system further includes a pair of bushings positioned within the pair of slots. The axial position sensing system yet further includes a geared rack integrally formed with one of the pair of bushings. The axial position sensing system also includes a sensor in operative contact with the geared rack to detect the axial position of the column structure.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
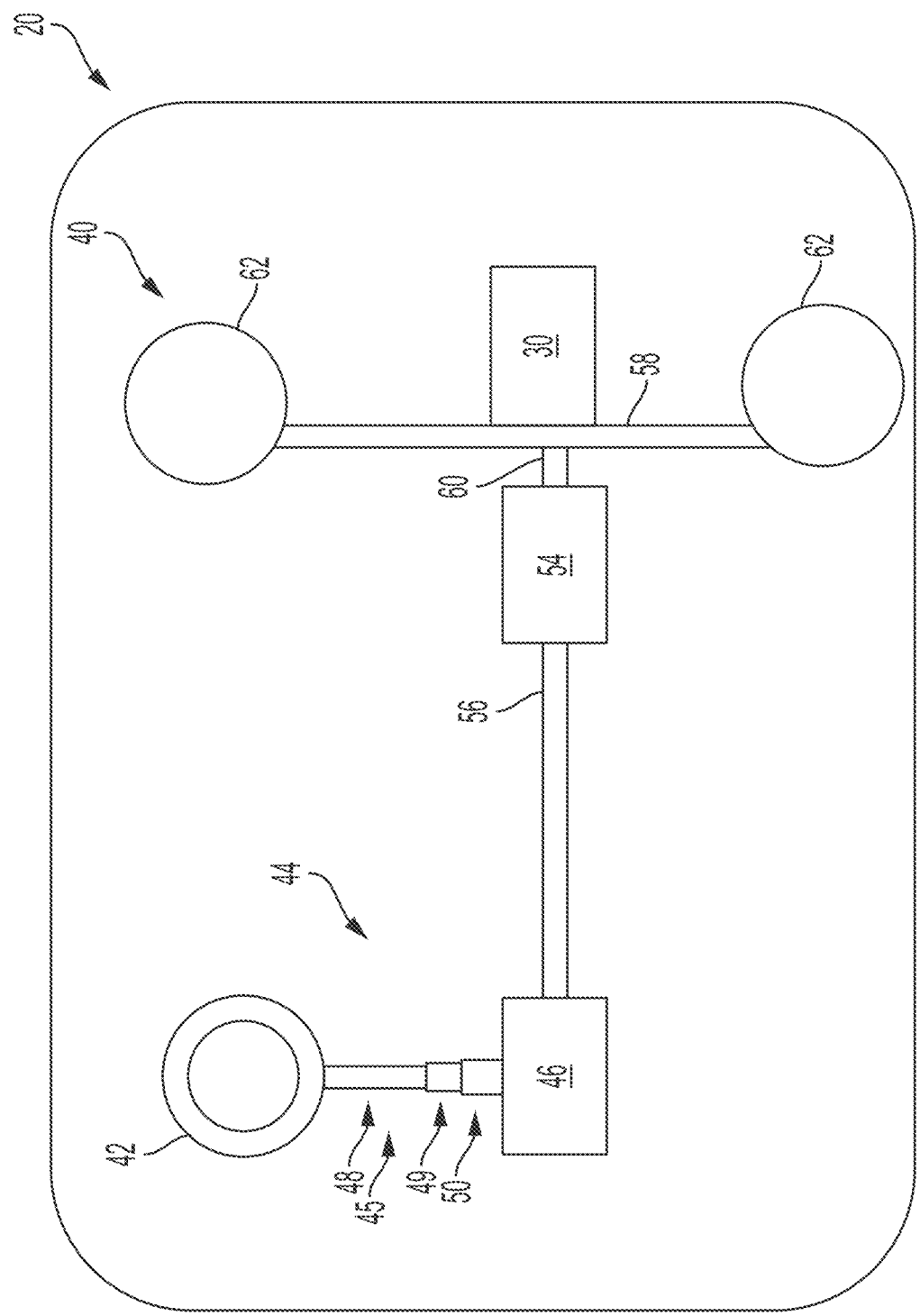
FIG. 1 schematically illustrates a vehicle steering system.

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions. In the past, a function of axially adjustable steering columns was to provide flexibility in the location of the hand wheel and facilitate more comfortable driving positions for different sizes of drivers. However, there are now opportunities for significantly more axial travel, which also may be referred to as stow travel (i.e., when the hand wheel is not needed). For example, the hand wheel could be repositioned completely away from the driver to allow him or her to do things other than operate the vehicle, such as work on a laptop computer when the vehicle is parked. Other examples include vehicles with autonomous driving capability, such that the hand wheel could be stowed when the vehicle is in an autonomous driving mode.

Referring now to the drawings, where the various embodiments are shown and described herein, without limiting same, the Figures illustrate embodiments of a steering column assembly that is axially adjustable with improved packaging and other operational benefits. The axial adjustability results from relative movement between two or more steering column portions (e.g. jackets, brackets, rails, and/or the like) that permit axial movement therebetween, in combination with relative movement between multiple steering shaft portions which permit axial movement therebetween. Axial movement refers to movement resulting from relative telescopic, sliding, or translational movement between components.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other vehicles. The vehicle 20 may include a propulsion system 30, such as an ignition system, an electronic system, or combinations thereof.

The vehicle 20 further includes a steering system 40. The steering system 40 may be configured as a driver interface steering system, an autonomous driving system, or a system that allows for both driver interface and autonomous steering. The steering system 40 may include an input device 42, such as a steering wheel, wherein a driver may mechanically provide a steering input by turning the steering wheel. A steering column assembly 44 includes a steering column 45 that extends along an axis from the input device 42 to an output assembly 46. The output assembly 46 may include a pinion shaft assembly, an I-shaft, a cardan joint, steer-by-wire components or any feature conventionally located opposite the input device 42.

The steering column 45 may include at least two axially adjustable portions, for example, an upper jacket 48 and a lower jacket 50 that are axially adjustable with respect to one another. The at least two axially adjustable portions may further include at least one third portion 49 that is disposed between the upper jacket 48 and the lower jacket 50 in some embodiments. It is to be appreciated that other structural features of the steering column 45 may be part of the upper jacket 48 and the lower jacket 50, such as brackets, rails, other devices, or combinations thereof.

The steering column 45 is moveable over a range of positions from a fully extended position to a fully retracted position. In the fully extended position, the upper jacket 48 and the lower jacket 50 are moved axially so that the input device 42 is located near an operator of the vehicle. In the retracted position, the upper jacket 48 and the lower jacket 50 are moved axially so that the input device 42 is located further away from an operator of the vehicle, when compared to the extended position. In some embodiments, the retracted position may correspond to stowing the input device 42. For example, it may be beneficial to place the input device 42 in a stowed location during autonomous driving. In operation, the axial movement of the upper jacket 48 and the lower jacket 50 may be effectuated by manual movement by an operator or electromechanically by a telescope actuator. This axial movement adjusts between the extended position, the retracted position, and any intermediary positions.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear and/or various traditional components. The output shaft 60 is operably connected to the steering gear assembly 54 such that a rotation of the steering gear input shaft 56 causes a responsive movement of the output shaft 60 and causes the drive axle to turn wheels 62. It is to be appreciated that the steering components described herein may be part of a steer-by-wire system or one which includes a direct mechanical linkage over the span of the components.

Figure 2:
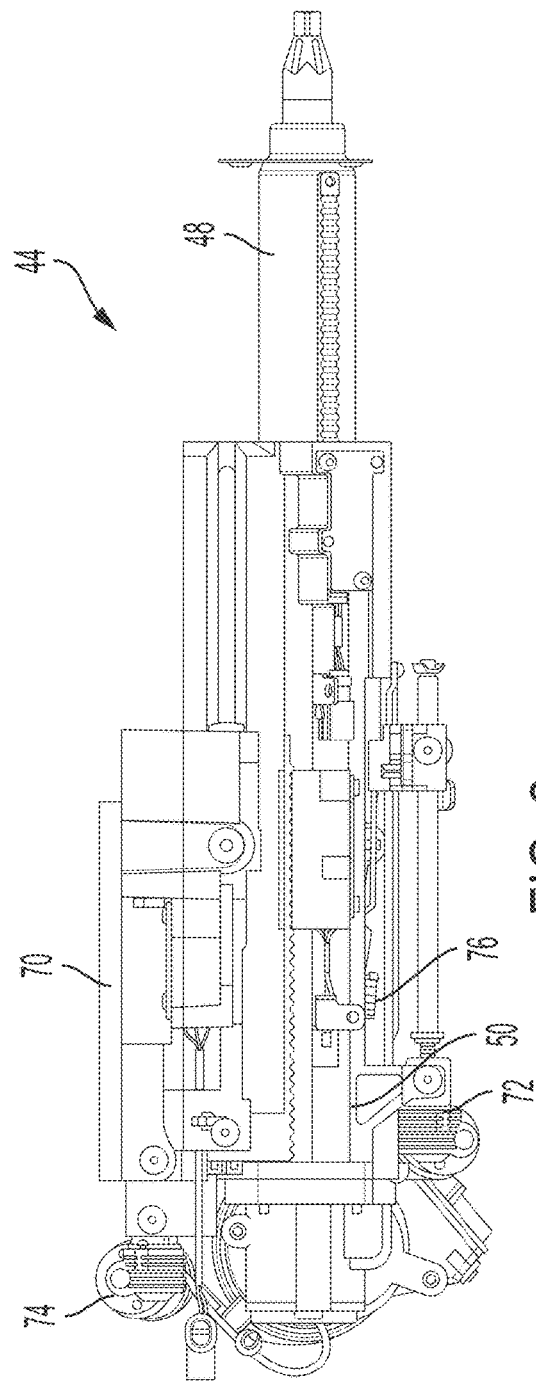
FIG. 2 is an elevation view of a steering column assembly for the vehicle steering system in a first rake position.
Figure 3:
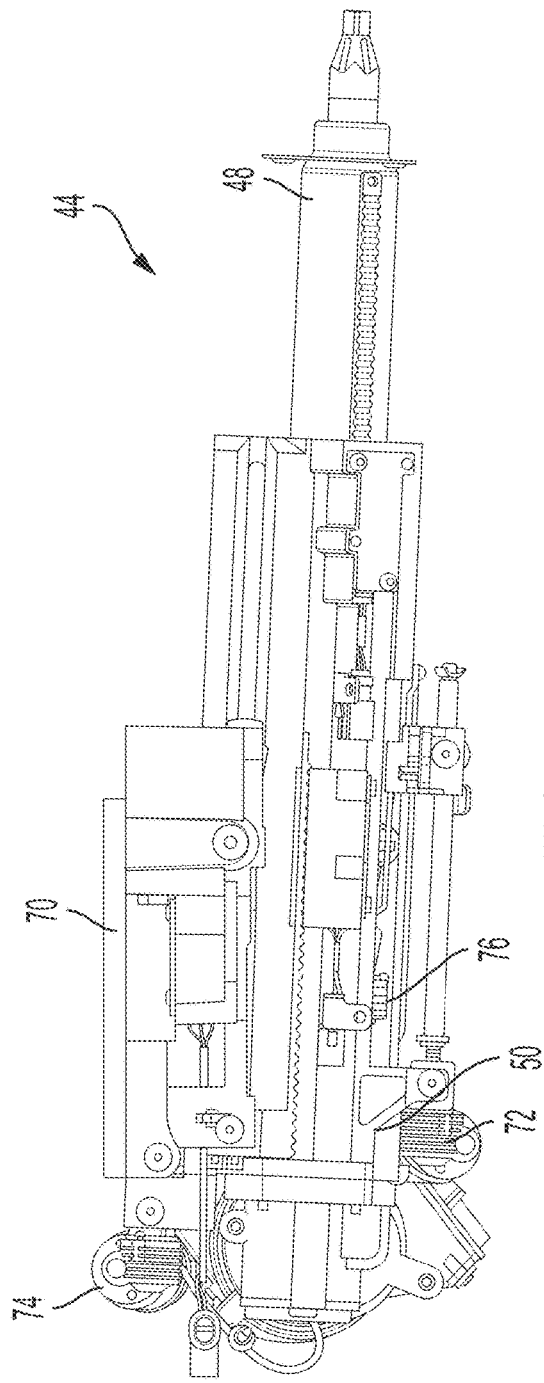
FIG. 3 is an elevation view of the steering column assembly in a second rake position.
Figure 4:
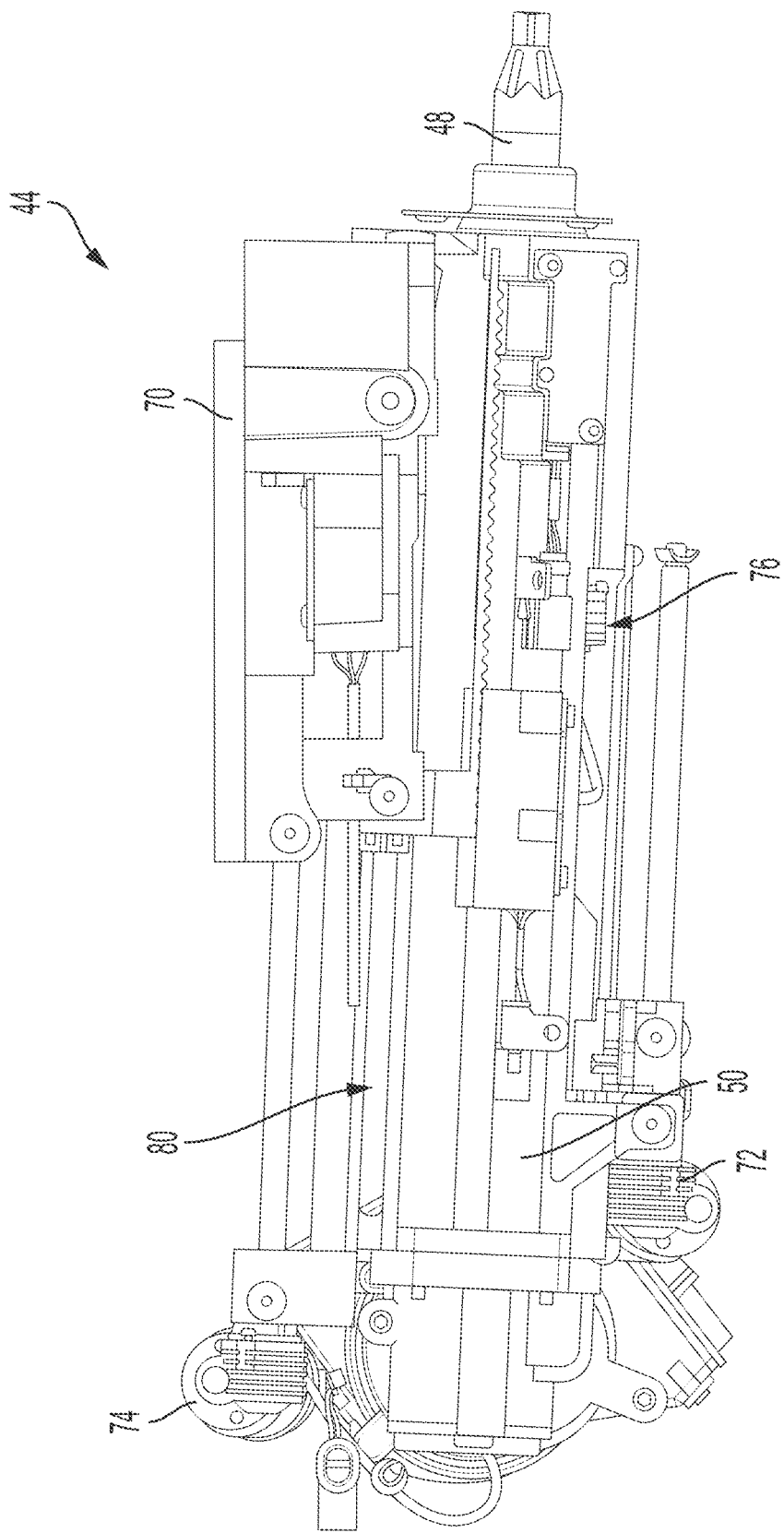
FIG. 4 is an elevation view of the steering column assembly in an axially stowed position.

With reference now to FIGS. 2 and 3, the steering column assembly 44 is illustrated in greater detail. The upper jacket 48 is shown protruding from the lower jacket 50. The lower jacket 50 is operatively coupled to, and axially translatable relative to, a column mounting bracket 70. The column mounting bracket 70 is fixed relative to a vehicle structure to mount the steering column assembly 44 to the vehicle 20. The upper jacket 48 is axially adjustable relative to the lower jacket 50 over a first range of axial positions which may be referred to as a "comfort range". The comfort range is a range of axial positions that are useful for manual driving during operation of the vehicle for different sized operators. The axial movement of the upper jacket 48 relative to the lower jacket 50 is done in a telescoping manner due to the movement of the upper jacket 48 within the lower jacket 50. The comfort range encompasses the entire comfort range and possibly a portion of the stowing range. The lower jacket 50 is axially adjustable relative to the column mounting bracket 70 over a second range of axial positions which may be referred to as a "stowing range". The stowing range is a range of axial positions that moves the overall steering column assembly 44 further away from the operator when compared to the comfort range. In some embodiments, the fully retracted position is a stowed position that may result in the steering input device (e.g., steering wheel) being flush with an instrument panel, firewall or other vehicle structure. The axial movement of the lower jacket 50 relative to the column mounting bracket 70 is done in a translating manner due to the movement of the overall upper and lower jackets together adjacent to the column mounting bracket 70. FIG. 4 illustrates the axial stowing adjustability of the steering column assembly 44, with the first portion 48 fully retracted within the second portion 50 and with the second portion 50 fully retractably translated, relative to the column mounting bracket 70.

The steering column assembly 44 includes a first actuator 72 which may be referred to as a comfort actuator. The first actuator 72 is operatively coupled to the upper jacket 48 to control the telescoping movement of the upper jacket 48 relative to the lower jacket 50 over the first range of axial positions. In the illustrated embodiment, the first actuator 72 is mounted to a specific portion of the steering column assembly 44, but other mounting locations are contemplated.

The steering column assembly 44 also includes a second actuator 74 which may be referred to as a stowing actuator. The second actuator 74 is operatively coupled to the lower jacket 50 to control the translating movement of the lower jacket 50 relative to the column mounting bracket 70 over the second range of axial positions. In the illustrated embodiment, the second actuator 74 is mounted to a specific portion of the steering column assembly 44, but other mounting locations are contemplated.

Both the first and second actuators 72, 74 are located proximate a forward location of the steering column assembly 44 to accommodate the axial movement during a stowing operation. The two actuators 72, 74 are responsible for the full stow motion of the column, however only the first actuator 72 operates during comfort adjustment within the first range of axial adjustment positions.

With continued reference to FIGS. 2 and 3, in addition to the axial adjustability of the steering column assembly 44, the steering column assembly 44 is adjustable in a rake direction which allows angular articulation of the overall steering column assembly 44 about a pivot axis that the lower jacket 50 rotates about. This effectively allows upward or downward movement of the steering input device 42 for a user's preference. A rake actuator assembly 76 is mounted to the lower jacket 50. As shown, the lower jacket 50, and therefore the steering column assembly 44, moves between various rake positions, including a first rake position (FIG. 2) and a lowered, second rake position (FIG. 3). It is to be understood that different ranges of rake adjustability will be employed for different steering column applications of use.

Figure 5:
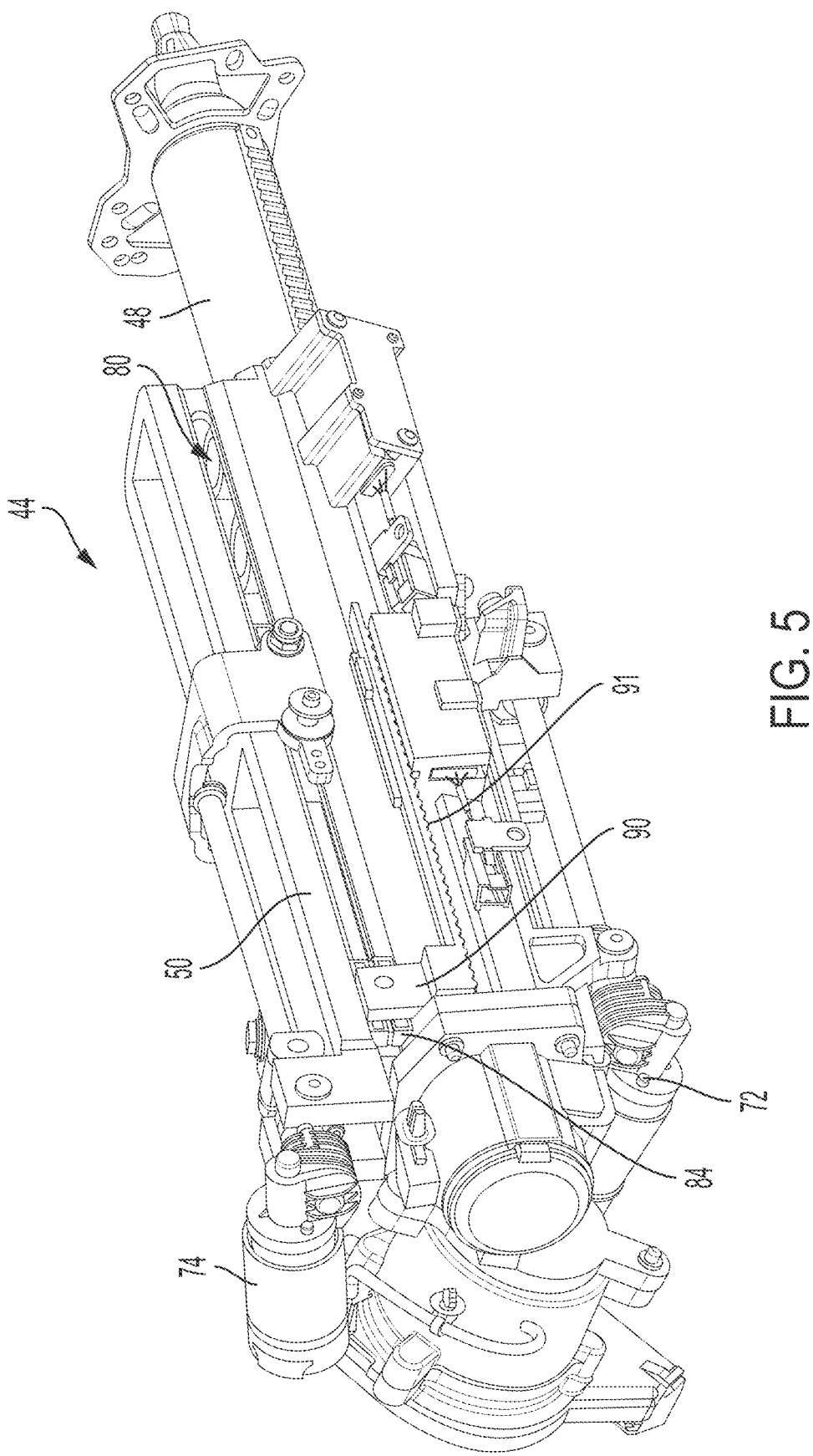
FIG. 5 is a perspective view of the steering column assembly illustrating a geared rack.

As shown in FIG. 5, the embodiments disclosed herein include tapered rail slots 80 defined within the lower jacket 50, which form a pair of tracks. In particular, a first track is formed on one side of the lower jacket 50 by one of the slots and a second track is formed on a second side of the lower jacket 50. At least one sliding wedge bushing 84 is disposed within each of the tapered rail slots 80. The sliding wedge bushings 84 have a tapered shape that substantially corresponds to the angled orientation of the tapered rail slots 80. The tapered rail slots 80 in each component serve as a receiving interface for the de-lashing sliding wedge bushings 84 and provide guidance for the lower jacket 50 to translate relative to the column mounting bracket 70 during stow operation.

A geared rack 90 is coupled to one or more wedge bushings 84 and engages the absolute position sensor 92. The geared rack 90 includes a surface having a plurality of teeth 91 formed on at least a portion of the length of the surface. Each geared rack 90 is coupled to one or more of the wedge bushings 84 or is integrally formed with the wedge bushings 84 to form a single, unitary component. The geared rack 90 and the wedge bushings 84 are operatively coupled to the column mounting bracket 70. Therefore, the geared rack 90 and the wedge bushings 84 remain stationary relative to the lower jacket 50 during translation of the lower jacket. However, the geared rack 90 and the wedge bushings 84 are coupled to the column mounting bracket 70 in a pivotable manner. As such, during rake articulation of the lower jacket 50, the wedge bushings 84 remain aligned with their respective tracks of the lower jacket 50 to allow guided translation of the lower jacket 50.

Figure 6:
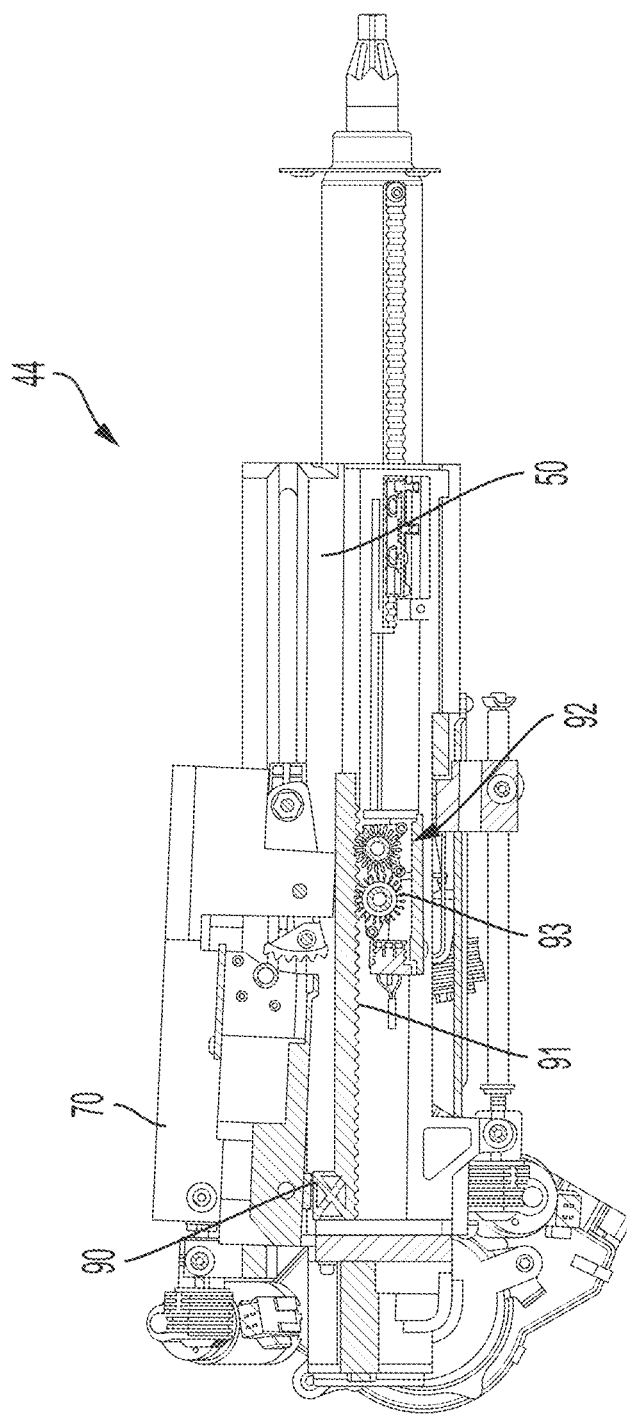
FIG. 6 is a perspective view of the steering column assembly illustrating the geared rack in contact with an absolute position sensor.

For the translating function of the stow motion, an absolute position sensor 92 is mounted to the lower jacket 50 (FIG. 6). As the lower jacket 50 goes through its rake articulations, the wedge bushings 84 follow the articulations, keeping the geared rack 90 in alignment with an absolute position sensor 92 that is fixed to the lower jacket 50. However, as the steering column assembly 44 moves into stow function, the wedge bushings 84—fixed positionally to the lower jacket 50—remain in place with the column mounting bracket 70 as the lower jacket 50 translates relative to the column mounting bracket 70 and the geared rack 90.

Referring to FIG. 6, as the lower jacket 50 translates, the plurality of teeth 91 of the geared rack 90 runs along cogged teeth 93 of the absolute position sensor 92, providing for an accurate account of the axial position of the steering column assembly 44, without being skewed during different rake positions of the lower jacket 50.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. An axially adjustable steering column assembly comprising:
   an upper jacket;
   a lower jacket, wherein the upper jacket is received within the lower jacket and is telescopingly adjustable therein, the lower jacket having a position sensor operatively coupled thereto;
   a column mounting bracket, wherein the lower jacket translates and rotates relative to the column mounting bracket; and
   a geared rack operatively coupled to the column mounting bracket, the geared rack correspondingly rotatable with the lower jacket, wherein the geared rack is in contact with a gear wheel of the position sensor to detect the axial position of the axially adjustable steering column assembly.

2. The axially adjustable steering column assembly of claim 1, wherein the geared rack includes a plurality of rack teeth, the sensor comprising an absolute position sensor having a toothed wheel in contact with the plurality of rack teeth.

3. The axially adjustable steering column assembly of claim 2, wherein the toothed wheel is one of a plurality of toothed wheels of the absolute position sensor.

4. The axially adjustable steering column assembly of claim 1, wherein the geared rack does not translate relative to the column mounting bracket.

5. The axially adjustable steering column assembly of claim 1, further comprising:
   a first actuator operatively coupled to the upper jacket to control axial adjustment of the upper jacket relative to the lower jacket;
   a second actuator operatively coupled to the lower jacket to control axial adjustment of the lower jacket relative to the column mounting bracket; and
   a rake actuator operatively coupled to the lower jacket to control rake adjustment of the lower jacket.

6. The axially adjustable steering column assembly of claim 1, wherein the geared rack is pivotable relative to the column mounting bracket.

* * * * *